(12) United States Patent
Dong et al.

(10) Patent No.: US 6,373,970 B1
(45) Date of Patent: Apr. 16, 2002

(54) IMAGE REGISTRATION USING FOURIER PHASE MATCHING

(75) Inventors: Fang Dong, Middleton; Weiguo Lu, Madison, both of WI (US)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 09/221,729

(22) Filed: Dec. 29, 1998

(51) Int. Cl.[7] ................................................. G06K 9/00
(52) U.S. Cl. ....................... 382/128; 382/280; 382/131; 382/296; 382/297; 128/923; 128/922
(58) Field of Search ................................. 382/280, 285, 382/128, 130, 131, 282, 295, 296, 297, 298; 250/455.11; 364/413.13; 128/922, 923

(56) References Cited

U.S. PATENT DOCUMENTS

| | | | | |
|---|---|---|---|---|
| 4,993,075 A | * | 2/1991 | Sikihara | 382/131 |
| 5,608,849 A | * | 3/1997 | King, Jr. | 395/119 |
| 5,633,951 A | * | 5/1997 | Moshfeghi | 382/154 |
| 5,841,889 A | * | 11/1998 | Seyed-Bolorforosh | 382/128 |
| 6,049,622 A | * | 4/2000 | Robb et al. | 382/128 |

OTHER PUBLICATIONS

Brown, "A Survey of Image Registration Techniques", ACM Computing Surveys, vol. 24, No. 4, Dec. 1992, pp. 325–376.
Casasent et al., "Position, rotation, and scale invariant optical correlation", Applied Optics, vol. 15, No. 7, Jul. 1976, pp. 1795–1799.
Castro et al., "Registration of Translated and Rotated Images Using Finite Fourier Transforms", IEEE Trans. Pattern Anaylsis & Machine Intelligence, vol. 9, No. 5, Sep. 1987, pp. 700–703.
Chen et al., "Symmetric Phase–Only Matched Filtering of Fourier–Mellin Transforms for Image Registration and Recognition", IEEE Trans. Pattern Analysis & Machine Intelligence, vol. 16, No. 12, Dec. 1994, pp. 1156–1168.
Horner et al., "Phase–only matched filtering", Applied Optics, vol. 23, No. 6, Mar. 1984, pp. 812–816.

* cited by examiner

*Primary Examiner*—Bhavesh Mehta
*Assistant Examiner*—Yosef Kassa
(74) *Attorney, Agent, or Firm*—Ostrager Chong & Flaherty LLP (57) ABSTRACT

A method and an apparatus for registering frames of imaging data using Fourier phase matching. Successive image frames of pixel data are processed using an image registration algorithm. Either image frames or the frames after edge detection are transformed into polar-logarithmic coordinates in the frequency domain and the phases of the Fourier transform of the resulting image representations, after inverse Fast Fourier transformation, are matched. The coordinates at the maximum phase difference are used to determine the scaling and rotation parameters needed for image frame registration. The frequency domain representation of one of the image frames is then scaled and rotated using an anti-aliasing algorithm in accordance with those parameters. The phase of the result is matched with the phase of the frequency domain representation of the other image frame to determine the translation parameters needed for image frame registration.

29 Claims, 4 Drawing Sheets

IMAGE REGISTRATION USING FOURIER PHASE MATCHING

FIELD OF THE INVENTION

This invention generally relates to methods for registering computer-generated images. In particular, the invention relates to the registration of images in an ultrasound imaging system.

BACKGROUND OF THE INVENTION

Conventional ultrasound imaging systems comprise an array of ultrasonic transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. A scan line's resolution is a result of the directivity of the associated transmit and receive beam pair.

A B-mode ultrasound image is composed of multiple image scan lines. The brightness of a pixel is based on the intensity of the echo return from the biological tissue being scanned. The outputs of the receive beamformer channels are coherently summed to form a respective pixel intensity value for each sample volume in the object region or volume of interest. These pixel intensity values are log-compressed and scan-converted to form an image frame of pixel data which can be displayed on a monitor.

Multiple scans are performed in succession and multiple image frames are displayed at the acoustic frame rate on the display monitor. In the case where the sonographer is manipulating the transducer probe by hand, any change in the angle (i.e., wobble) of the probe during scanning will cause corresponding changes in the angle at which the transmit beam impinges on the biological tissue being imaged. The result is that some tissue will appear bright during one scan at one angle and dark during another scan at another angle. To compensate for this angle-dependent fluctuation in the intensity of the echo signals reflected by the tissue, it is well known to combine the bright regions from successive image frames to form a compound image. This process is known as spatial compounding. The key to successful spatial compounding of the ultrasound images from different angles is to accurately register the ultrasound image frames. Errors in image registration during compounding can cause blurring and possibly loss of the details in the original images.

Several methods have been used successfully in ultrasound image registration, including the minimum sum of absolute differences (MSAD) technique, the correlation technique and the landmark matching technique. These techniques are based on spatial domain analysis of image features and may be sensitive to noise. The MSAD technique, which might be the best among these spatial domain techniques, has the advantages of being simple and fast, but it is not accurate in rotational registration, especially for large rotation angles. The correlation technique is computationally very expensive. Also the correlation technique is prone to error for large rotation angles. The landmark matching technique has limited application in ultrasound image registration because it is difficult to do automatic registration using this technique. Furthermore, it is difficult to deal with scaling (dilation) using any spatial domain technique.

Thus there is a need for an ultrasound image registration technique which is not afflicted with the disadvantages of the spatial domain techniques.

SUMMARY OF THE INVENTION

The present invention is a method and an apparatus for registration of frames of computer-generated images (hereinafter "image registration"). Although the preferred embodiment is an ultrasound imaging system in which image registration is used to prepare multiple images for spatial compounding or for three-dimensional reconstruction, the invention also has application in other imaging modalities, such as computerized tomography and magnetic resonance imaging.

The preferred embodiment of the invention using a technique which will be referred to herein as "Fourier phase matching". This Fourier phase matching technique is performed by a computer after a multiplicity of image frames of pixel intensity data have been acquired and stored, e.g., in cine memory. The computer is programmed to perform an algorithm on the data of these image frames to achieve image registration prior to spatial compounding or three-dimensional reconstruction, either of which may also be performed by the same computer. The computer may be the system host computer or a dedicated processor. In accordance with the preferred embodiments of the invention, the image registration algorithm comprises a Fourier phase matching technique.

The image registration technique in accordance with the preferred embodiments translates, rotates and scales each image frame of a succession of frames to achieve registration with the previous image frame. This Fourier phase matching technique is based on the frequency domain matched filter (for phase) concept, so it is simple to implement, accurate and less affected by image noise. This method has been used for optical image registration in the prior art.

In accordance with one preferred embodiment, a series of consecutive image frames are retrieved from the memory of an ultrasound imaging system. The image frames are selected by the system operator using an operator interface, e.g., a trackball control. Each selected image frame is registered with the previous image frame using the image registration algorithm. After image registration, the registered frames of pixel intensity data are compounded, e.g., by selecting the maximum (i.e., peak) value of the pixel values corresponding to a particular pixel position in the respective registered image frames or by calculating the mean (i.e., average) of the pixel values corresponding to a particular pixel position in the respective registered image frames. If the maximum pixel value is used, an appropriate normalization may be performed to ensure that the compounded image has a desired overall intensity level when displayed.

DETAILED DESCRIPTION OF THE PREFERRED EMBODIMENTS

Figure 1:
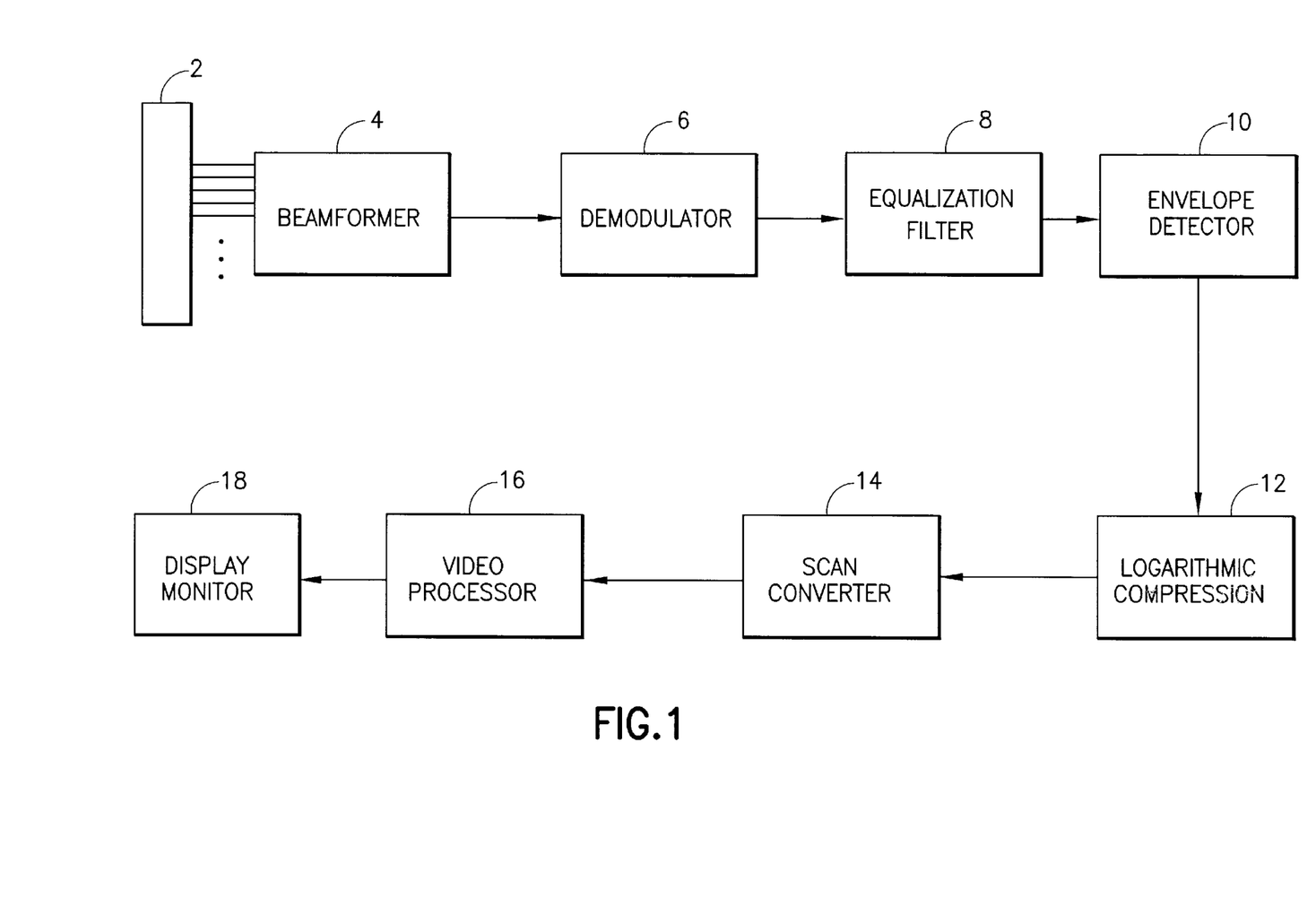
FIG. 1 is a block diagram showing the B-mode signal processing chain for one type of ultrasound imaging system in which the present invention can be incorporated.

One type of ultrasound imaging system in which the present invention can be incorporated is shown in FIG. 1. The system comprises a transducer array 2 consisting of a plurality of separately driven transducer elements, each of which produces a burst of ultrasonic energy when energized by a pulsed waveform produced by a transmitter incorporated in beamformer 4. The ultrasonic energy reflected back to transducer array 2 from the object under study is converted to an electrical signal by each receiving transducer element and applied separately to a receiver incorporated in beamformer 4 through a set of transmit/receive (T/R) switches (not shown). The transmit and receive beamformers 4 are operated under control of a host computer. A complete scan is performed by acquiring a series of echoes in which the transmitter is gated on momentarily to energize each transducer element in the transmit aperture, and the subsequent echo signals produced by each transducer element are applied to the receiver. The receiver combines the separate echo signals from each transducer element to produce a single echo signal which is used to produce a line in an image on a display monitor 18.

The receiver's signal inputs are the low-level analog RF signals from the transducer elements. The receiver is responsible for analog-to-digital conversion and for receive beamforming. In baseband imaging systems, the beamsummed signal is output to a demodulator 6, which converts the beamsummed signal into baseband in-phase I and quadrature Q receive beams. The I and Q acoustic data vectors from the demodulator 6 are output to an FIR filter 8, which is programmed with filter coefficients from a filter coefficient memory (not shown). The filter coefficient memory is programmed by the host computer. The demodulator 6 and FIR filter 8 are programmed to convert a band of frequencies centered at the fundamental frequency $f_0$ of the transmit waveform (or a (sub)harmonic frequency thereof) to baseband I/Q data.

Vectors of I and Q acoustic data are optionally subject to a TGC/LGC block (not shown), which provides time gain and/or lateral gain compensation. Time gain compensation fine tunes the image in the axial direction by increasing or decreasing gain as a function of depth (time) for all received vectors. Lateral gain compensation fine tunes the image in the lateral direction by increasing or decreasing gain as a function of lateral position (beam or vector position). In the former case, gain is controlled in small rows of the image. In the latter case, gain is controlled in small sectors of the image.

After filtering, the acoustic data is sent to a B-mode processor, which converts the I and Q acoustic data into a log-compressed version of the signal envelope. The B-mode processor comprises an envelope detector 10 for forming the envelope of the beamsummed receive signal. The envelope of a baseband signal is the magnitude of the vector which I and Q represent. The I,Q phase angle is not used in the B-mode display. The magnitude (i.e., intensity) of the signal is the square root of the sum of the squares of the orthogonal components, i.e., $(I^2+Q^2)^{1/2}$. The envelope of the signal undergoes some additional B-mode processing, such as logarithmic compression (block 12 in FIG. 1).

The B-mode intensity data is output to a scan converter 14, which converts that data into an X-Y format. The scan-converted frames are passed to a video processor 16, which maps the video data to a gray-scale mapping for video display. The gray-scale image frames are then sent to the video monitor 18 for display. The images displayed by the video monitor 18 are produced from an image frame of data in which each datum indicates the intensity or brightness of a respective pixel in the display. An image frame may, e.g., comprise a 256×256 data array in which each intensity datum is a multi-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed. The displayed image represents the tissue and/or blood flow in a plane through the body being imaged.

In another conventional system, the RF signals are summed, equalized and envelope detected without intervening demodulation to baseband. To depict such a system, it is only necessary to remove block 6 from FIG. 1 and connect the output of the beamformer 4 to the input of the equalization filter 8. It should be appreciated that the invention can be employed in both RF and baseband systems.

Figure 2:
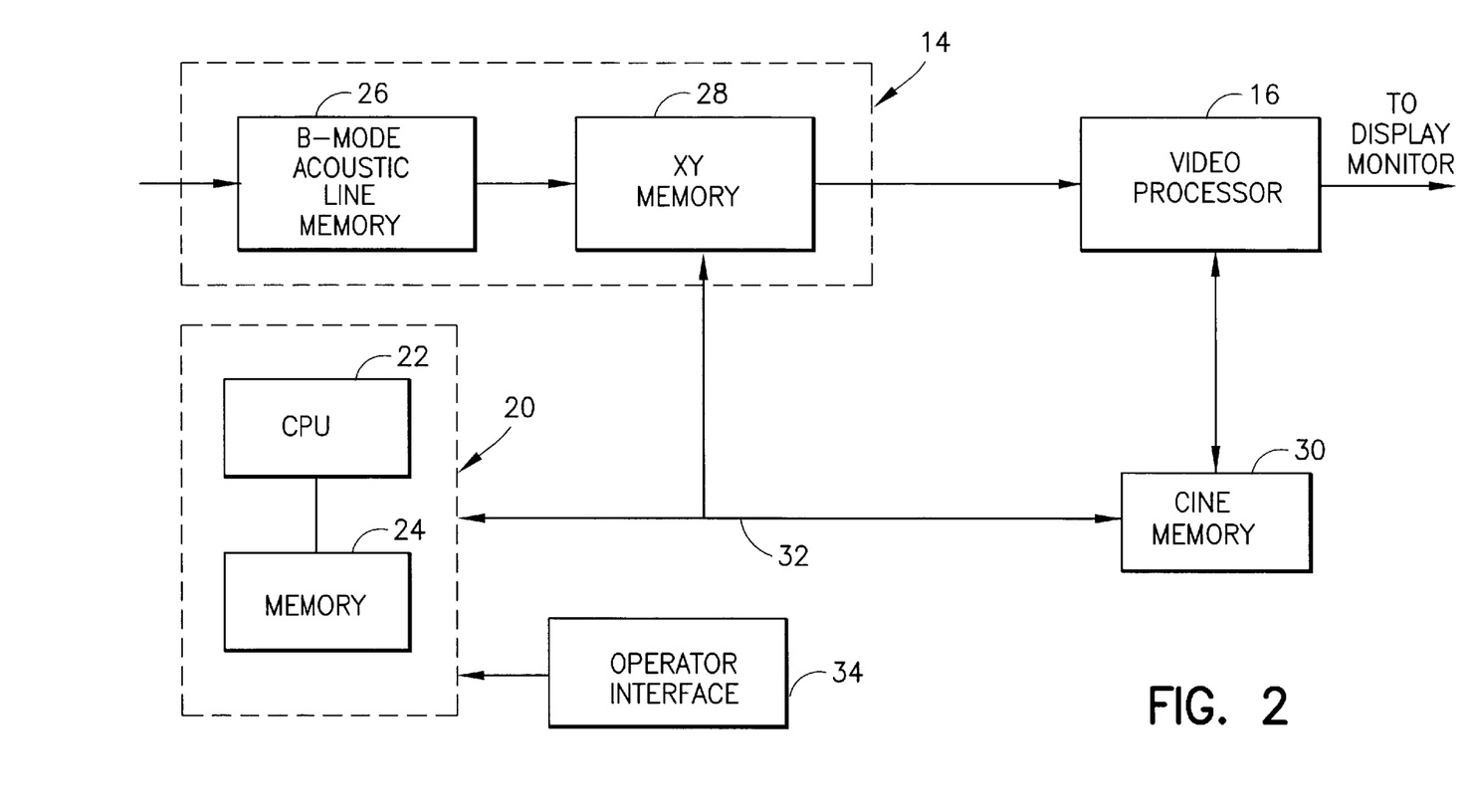
FIG. 2 is a block diagram showing the back end of the ultrasound imaging system shown in FIG. 1, with the addition of a host computer programmed to perform image registration in accordance with one preferred embodiment of the invention.

Referring to FIG. 2, system control is centered in the host computer 20, which accepts operator inputs through an operator interface 34 (e.g., a control panel) and in turn controls the various subsystems. The host computer 26 performs system level control functions. A scan controller (not shown) provides real-time (acoustic vector rate) control inputs to the various subsystems. The scan controller is programmed by the host computer with the vector sequences and synchronization options for acoustic frame acquisitions. Thus, the scan controller controls the beam distribution and the beam density. The scan controller transmits the beam parameters defined by the host computer to the subsystems via a scan control bus (not shown).

The scan converter 14 comprises an acoustic line memory 26 for scan converting B-mode data and an X-Y display memory 28 for storing each frame of scan-converted data in a respective one of a bank of frame memories. The acoustic line memory accepts the processed vectors of B-mode intensity data and interpolates where necessary, and also performs the coordinate transformation of the B-mode intensity data from polar coordinate (R–θ) sector format or Cartesian coordinate linear format to appropriately scaled Cartesian coordinate display pixel intensity data, which is stored in the X-Y display memory.

Each image frame from the X-Y memory 28 is passed to the video processor 16, which converts the pixel intensity data to the video frame rate and then maps the pixel intensity data to a gray-scale mapping for video display. A conventional ultrasound imaging system typically employs a variety of gray maps, which are simple transfer functions of the raw intensity data to display gray-scale levels. The gray-scale image frames are then sent to the display monitor 18 for display.

Successive frames of display pixel intensity data (i.e., data not yet gray-mapped by the video processor) are stored in a cine memory 30 on a first-in, first-out basis. Storage can be continuous or as a result of an external trigger event. The cine memory 30 is like a circular image buffer that runs in the background, capturing image data that is displayed in real time to the user. When the user freezes the system (by operation of an appropriate device on the operator interface 34), the user has the capability to view image data previously captured in cine memory.

The host computer 20 comprises a central processing unit (CPU) 22 and a random access memory 24. The CPU 22 is programmed to control the time delays applied by the transmit and receive beamformers, the filtering applied by the filter, and the mapping applied by the video processor. The host computer also controls the flow of data between the X-Y display memory 28, the video processor 16, the cine memory 30 and the host computer 20 itself. In particular, the flow of data to and from the host computer 20 is indicated by the system data bus 32 in FIG. 2. Each frame of pixel data, representing one of a multiplicity of scans or slices through the object being examined, can by retrieved by the host computer from the X-Y display memory 28 or from the cine memory 30, which stores a stack of frames. In accordance with one preferred embodiment of the invention, the CPU 22 retrieves two successive image frames (from either X-Y display memory 28 or cine memory 30) and then performs Fourier phase matching filtering to achieve image registration, as described in more detail below. Each registered image is stored in memory 24. Upon registration of a predetermined number of image frames, the image frames in that multiplicity are retrieved from memory 24 and compounded by CPU 22 using a conventional spatial compounding algorithm, e.g., by selecting the maximum (i.e., peak) value of the pixel values corresponding to a particular pixel position in the respective registered image frames or by calculating the mean (i.e., average) of the pixel values corresponding to a particular pixel position in the respective registered image frames. If the maximum pixel value is used, an appropriate normalization may be performed to ensure that the compounded image has a desired overall intensity level when displayed.

Figure 3:
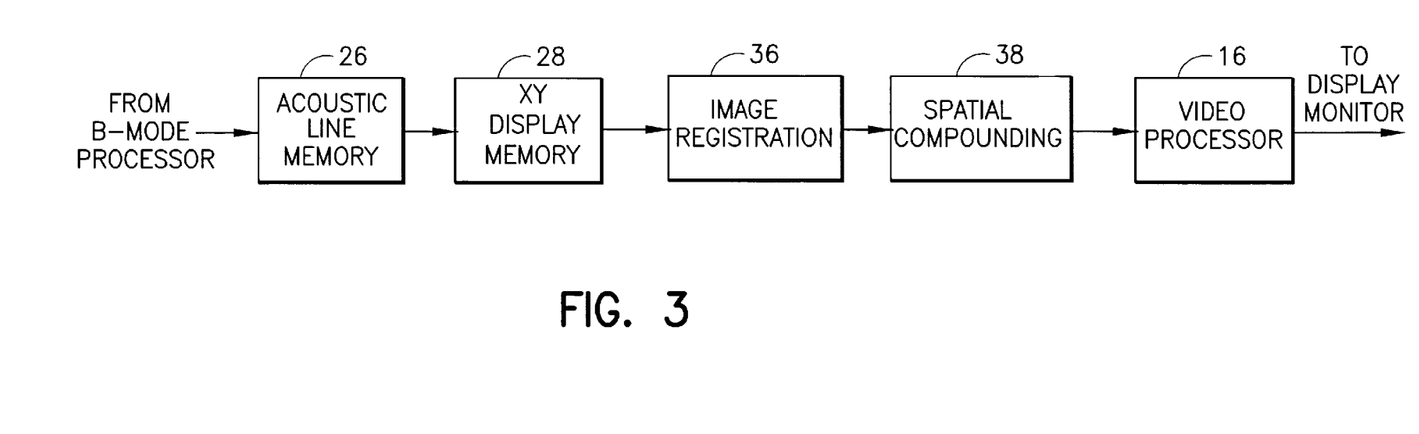
FIG. 3 is a block diagram showing another preferred embodiment of the invention having dedicated processors for performing image registration and spatial compounding.

An alternative preferred embodiment for performing image registration and spatial compounding is generally depicted in FIG. 3. In this embodiment, each successive image frame from the X-Y display memory 28 is output to an image registration circuit 36 comprising buffer memory for storing a predetermined number of image frames and a dedicated processor programmed to perform image registration using the algorithm shown in FIG. 4. The in-registration image frames are then output to a spatial compounding circuit 38, which comprises buffer memory and a dedicated processor programmed to perform spatial compounding. The compound image frame is then output to the video processor 16 for video display.

Figure 4:
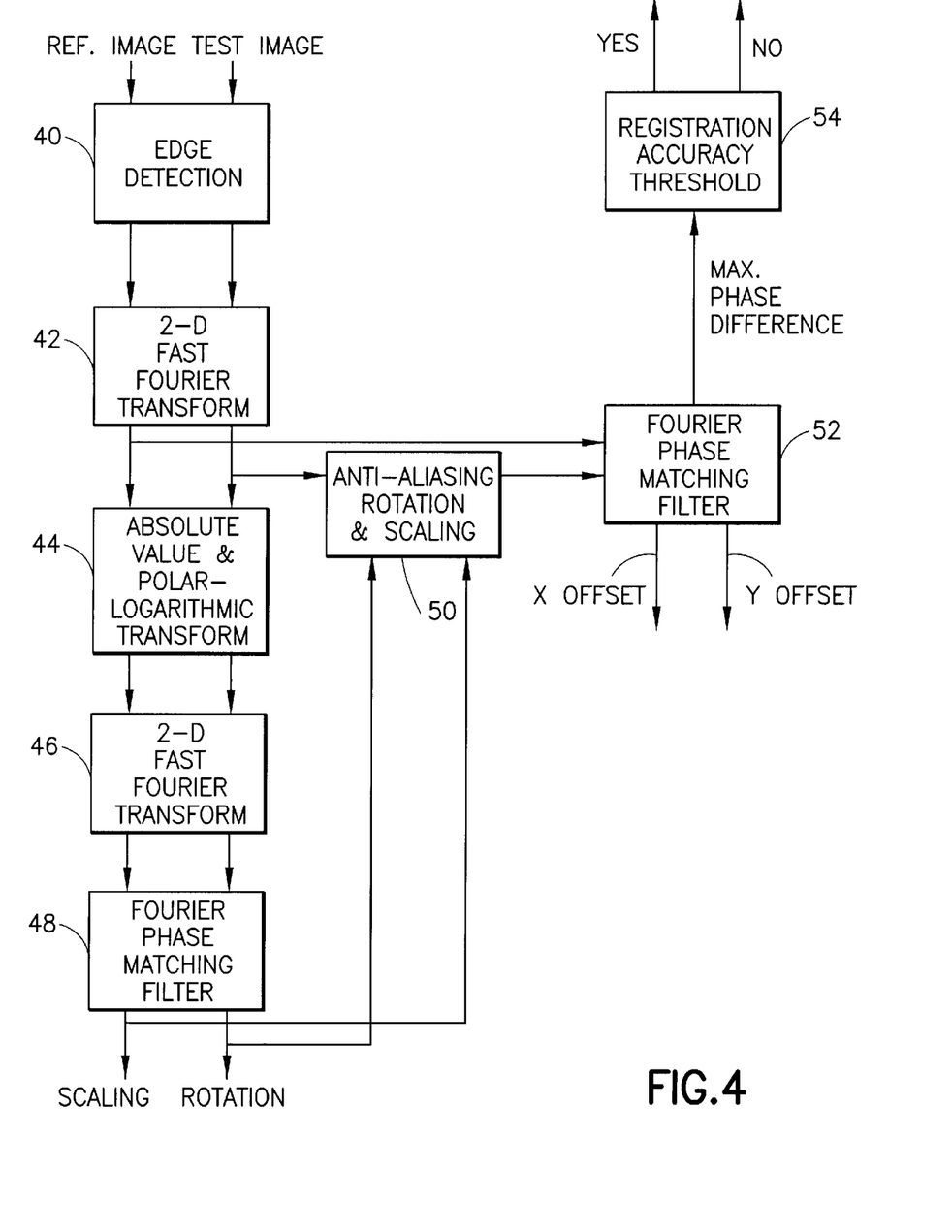
FIG. 4 is a block diagram showing the steps of the image registration algorithm in accordance with the preferred embodiments of the invention.

Referring to FIG. 4, the image registration algorithm in accordance with the foregoing preferred embodiments comprises the following steps. The image frame currently retrieved from memory is assigned as the test image $g(x, y)$, and the previous image frame is assigned as the reference image $f(x, y)$, where x and y are the pixel coordinates. The test and reference images are optionally both passed through an edge detection block 40. The advantages to performing edge detection are threefold. First, high pass filtering the image removes very strong low-frequency signals, which can overshadow the high-frequency signals and possibly cause false registration. Second, the intensity modulation frequency is eliminated. Some images are intensity modulated due to non-uniform TGC settings, speckle noise or compounding of multiple images acquired from different focusing depths. Third, the speed of the subsequent two-dimensional Fast Fourier transformation (2-D FFT) is improved because the resulting images from the edge detection block are all binary images. However, edge detection is not essential to practice of the invention.

The test and reference images (or edge-detected versions thereof) are sent to be Fast Fourier-transformed using a 2-D FFT 42. The results are the frequency domain representations of two images: $G(u, v)$ and $F(u, v)$. To improve the efficiency of the 2-D FFT 42, the test and reference image data can be combined (in an "even location-odd location" separation). Only one 2D FFT is needed to transform both test and reference image data because all the data are real. After the 2-D FFT, which produces complex data having magnitude and phase, the test and reference image data are decoupled. In step 44, the spectral magnitudes (i.e., absolute values) of both test and reference images are polar-logarithmically transformed into image representations as $g_{pl}(\theta, \lambda)$ and $f_{pl}(\theta, \lambda)$, where θ is the angle of the polar coordinate system in the frequency domain and $\lambda = \log(\rho)$, where ρ is the radial distance of the polar coordinate system in the frequency domain. After polar-logarithmic transformation in step 44, a 2D FFT is performed (step 46) on the polar-logarithmic representations of the test and reference images, $g_{pl}(\theta, \lambda)$ and $f_{pl}(\theta, \lambda)$. The complex results of step 46, designated $G_{pl}(\xi, \eta)$ and $F_{pl}(\xi, \eta)$, are then operated on by a Fourier phase matching filter 48, which extracts the phase from $G_{pl}(\xi, \eta)$ and from $F_{pl}(\xi, \eta)$, determines the difference between the extracted phases, performs a two-dimensional inverse FFT on that phase difference, searches for the maximum of the result of that 2-D inverse FFT, and determines the x, y coordinates of that maximum, namely, $x_{max1}$ and $y_{max1}$. The scaling and rotation parameters are determined from the coordinates of the detected maximum, i.e., the rotation angle $\alpha = \pi(x_{max1}/N_x)$ and the scaling factor $\sigma = e^{y_{max1}/N_y}$, where $N_x$ and $N_y$ are the total re-sample numbers along the angular and polar coordinates respectively.

The test image in the frequency domain, $G(u, v)$, is then rotated by an angle $-\alpha$ and scaled by a scaling factor σ according to the calculated rotation and scaling parameters α and σ. The test image is re-rotated and re-scaled in the frequency domain instead of the original spatial domain in order to increase the speed of the algorithm. This eliminates one 2D FFT computation, which is very expensive even for a fast CPU or dedicated imaging processor.

When the host computer or other signal processing unit performs these rotation and scaling operations, it re-samples the digital image data using some specific interpolation method such as bilinear interpolation. The rotation and scaling are then performed according to the following operation matrix:

$$T = \sigma \begin{bmatrix} \cos\theta & -\sin\theta \\ \sin\theta & \cos\theta \end{bmatrix} \qquad (1)$$

where σ is the scaling factor and θ is the rotation angle. The rotation transformation may cause aliasing in the digital image due to the fact that the sampling rate is not high enough for those points far away from the origin of the rotation, and probably too high for those points close to the origin of the rotation. One way to prevent this kind of aliasing is to separate the rotation and scaling matrix T into three consecutive operations:

$$T = \begin{bmatrix} 1 & 0 \\ tg\theta & 1 \end{bmatrix} \begin{bmatrix} \sigma\cos\theta & 0 \\ 0 & \sigma\sec\theta \end{bmatrix} \begin{bmatrix} 1 & tg(-\theta) \\ 0 & 1 \end{bmatrix} \qquad (2)$$
$$= H_y(\theta) S(\sigma\cos\theta, \sigma\sec\theta) H_x(-\theta)$$

where $H_x(-\theta)$ is the shear transformation along the x axis; $S(\sigma \cos \theta, \sigma \sec \theta)$ is the scaling along both the x and y axes; and $H_y(\theta)$ is the inverse shear transformation along the y axis. Thus a rotation transformation can be expressed as a sequence of a shear in the x direction, a scaling in both the x and y directions, and an inverse shear in the y direction. These shear and scaling transformations do not introduce any aliasing. Consequently, by separating the transformation matrix T into three basic operations, aliasing can be prevented. These operations are performed by the anti-aliasing rotation and scaling block 50 (see FIG. 4).

The output of the anti-aliasing rotation and scaling block 50 is a rotated and scaled frequency domain representation G'(u, v) of the test image. The frequency domain representations F(u, v) and G'(u, v) are then operated on by a Fourier phase matching filter 52, which extracts the phases from F(u, v) and G'(u, v), determines the difference between those extracted phases, performs a two-dimensional inverse FFT on that phase difference, searches for the maximum of the result of that 2-D inverse FFT, and then determines the x, y coordinates of that maximum, namely, $x_{max2}$ and $y_{max2}$. The translation parameters are determined from the coordinates of the detected maximum, i.e., the x-axis offset $x_{offset} = x_{max2}$ and the y-axis offset $y_{offset} = y_{max2}$.

In the event that features in consecutive image frames having very little in common (this may be due to the operator moving the probe too fast, causing major anatomical structures in one frame being totally absent in the following frame), the foregoing method will give incorrect rotation, scaling and translation parameters. To assess or predict the correctness of the registration results, the maximum phase difference determined by block 52 is compared to a predetermined threshold, e.g., 0.05, in registration accuracy threshold block 54 (see FIG. 4). If the maximum value is less than the threshold, then the results may not be accurate (indicated by the output labeled NO in FIG. 4). In that event, the current registration parameters should not be used, and the system should ignore the current frame and process the next frame. Alternatively, the system can increase the re-sampling rate in the polar-logarithmic transformation and repeat the algorithm on the current frame until the maximum value of the phase difference exceeds the predetermined threshold.

If the threshold is exceeded (indicated by the output labeled YES in FIG. 4), the host computer or dedicated processor rotates, scales and translates the test image frame in accordance with the calculated parameters to achieve registration with the reference image frame. Specifically, the test image frame is rotated by the rotation angle $-\alpha$, scaled with the scaling factor $1/\sigma$, translated in the x-direction by the x-axis offset $-x_{offset}$, and translated in the y-direction by the y-axis offset $-y_{offset}$. The entire process depicted in FIG. 4 is repeated for each new image frame retrieved from memory until the number of in-registration image frames equals the number required by the spatial compounding algorithm.

Although the disclosed preferred embodiments employ the image registration technique of the invention as a step preliminary to spatial compounding, it should be apparent that the invention is not limited to only this application. For example, the image registration technique of the invention can be used align a stack of image frames prior to reconstructing a three-dimensional image by pixel projection.

The foregoing preferred embodiments have been disclosed for the purpose of illustration. Variations and modifications of the concept of the invention will be readily apparent to persons skilled in the art. For example, the invention also has application in other imaging modalities, such as computerized tomography and magnetic resonance imaging. All such variations and modifications are intended to be encompassed by the claims set forth hereinafter.

As used in the claims, the phrase "as a function of" is not to be construed to mean "as a function of only" what follows. For example, in accordance with the foregoing definition, the phrase "determine y as a function of x" would read on all cases where y was determined as a function of x alone or as a function of x and one or more other variables, e.g., z.

What is claimed is:

1. A method for image frame registration, comprising the steps of:
    storing first and second image frames of pixel values;
    transforming said first and second image frames into first and second frequency domain representations respectively using a two-dimensional Fast Fourier transformation;
    processing said first and second frequency domain representations to determine a rotation parameter and a scaling parameter needed for said first image frame to be in registration with said second image frame;
    rotating said first image frame in accordance with said rotation parameter; and
    scaling said first image frame in accordance with said scaling parameter.

2. The method as recited in claim 1, further comprising the steps of:
    rotating and scaling said first frequency domain representation in accordance with shear transformations that are a function of said rotation parameter and a scaling transformation that is a function of said rotation parameter and said scaling parameter;
    processing said rotated and scaled first frequency domain representation and said second frequency domain representation to determine first and second translation parameters; and translating said first image frame in first and second directions in accordance with said first and second translation parameters respectively.

3. The method as recited in claim 1, wherein said processing step for determining rotation and scaling parameters comprises the steps of:

transforming the magnitudes of said first and second frequency domain representations into polar coordinates in the frequency domain to form first and second polar-logarithmic representations respectively;

transforming said first and second polar-logarithmic representations into first and second Fourier-transformed polar-logarithmic representations respectively using a two-dimensional Fast Fourier transformation;

extracting the phase from each of said first and second Fourier-transformed polar-logarithmic representations;

transforming a phase difference between said phases of said first and second Fourier-transformed polar-logarithmic representations using a two-dimensional inverse Fast Fourier transformation;

detecting a maximum in said phase difference;

determining said rotation parameter as a function of a first coordinate of said maximum; and determining said scaling parameter as a function of a second coordinate of said maximum.

4. The method as recited in claim 2, wherein said processing step for determining translation parameters comprises the steps of:

extracting the phase from each of said rotated and scaled first frequency domain representation and said second frequency domain representation;

transforming a phase difference between said phase of said rotated and scaled first frequency domain representation and said phase of said second frequency domain representation using a two-dimensional inverse Fast Fourier transformation; and detecting a maximum in said phase difference, said first and second translation parameters being first and second coordinates of said maximum respectively.

5. The method as recited in claim 4, further comprising the step of comparing said maximum phase difference to a predetermined threshold.

6. A system for image frame registration comprising:

a memory for storing first and second image frames of pixel values; and an image registration processor programmed to perform the steps of:

(a) transforming said first and second image frames into first and second frequency domain representations respectively using a two-dimensional Fast Fourier transformation;

(b) processing said first and second frequency domain representations to determine a rotation parameter and a scaling parameter needed for said first image frame to be in registration with said second image frame;

(c) rotating said first image frame in accordance with said rotation parameter; and (d) scaling said first image frame in accordance with said scaling parameter.

7. The system as recited in claim 6, wherein said image registration processor is further programmed to perform the following steps:

(a) rotating and scaling said first frequency domain representation in accordance with shear transformations that are a function of said rotation parameter and a scaling transformation that is a function of said rotation parameter and said scaling parameter;

(b) processing said rotated and scaled first frequency domain representation and said second frequency domain representation to determine first and second translation parameters;

(c) translating said first image frame in first and second directions in accordance with said first and second translation parameters respectively; and (d) storing said rotated, scaled and translated first image frame in said memory.

8. An ultrasound imaging system comprising:

an ultrasound transducer array comprising a multiplicity of transducer elements;

a transmit beamformer for pulsing selected transducer elements during first and second series of transmit firings constituting first and second scans respectively;

a receive beamformer coupled to selected transducer elements of said transducer array for acquiring a respective receive signal subsequent to each transmit firing;

a signal processor programmed to form first and second sets of processed signals from said receive signals for said first and second scans respectively;

a converter for converting said first and second sets of processed signals into said first and second image frames respectively;

a memory for storing first and second image frames of pixel values; and a computer programmed to rotate, scale and translate said second image frame to be in registration with said first image frame based on phase matching of frequency domain representations derived from said first and second image frames, and produce a final image frame of pixel data which is a function of said first image frame and said rotated, scaled and translated second image frame; and a display device comprising a multiplicity of pixels for displaying said final image frame.

9. An ultrasound imaging system comprising:

a memory for storing first and second image frames of ultrasound pixel data;

a computer programmed to rotate, scale and translate said second image frame to be in registration with said first image frame based on phase matching of frequency domain representations derived from said first and second image frames, and produce a final image frame of pixel data which is a function of said first image frame and said rotated, scaled and translated second image frame; and a display device comprising a multiplicity of pixels for displaying said final image frame.

10. A method for ultrasound imaging comprising the steps of:

storing first and second image frames of ultrasound imaging data;

rotating, scaling and translating said second image frame to be in registration with said first image frame based on phase matching of frequency domain representations derived from said first and second image frames;

producing a final image frame of pixel data which is a function of said first image frame and said rotated, scaled and translated second image frame; and displaying said final image frame.

11. The method as recited in claim 10, wherein said final image frame of pixel data is produced by spatially compounding a set of image frames including at least said first image frame and said rotated, scaled and translated second image frame.

12. The method as recited in claim 10, wherein said final image frame of pixel data is produced by reconstructing a three-dimensional image from a set of image frames including at least said first image frame and said rotated, scaled and translated second image frame.

13. An imaging system comprising:
 a memory for storing first and second image frames of pixel values;
 a computer programmed to perform the steps of:
  (a) transforming said first and second image frames into first and second frequency domain representations respectively using a two-dimensional Fast Fourier transformation;
  (b) processing said first and second frequency domain representations to determine a rotation parameter and a scaling parameter needed for said first image frame to be in registration with said second image frame;
  (c) rotating said first image frame in accordance with said rotation parameter;
  (d) scaling said first image frame in accordance with said scaling parameter; and
  (e) producing a final image frame of pixel data which is a function of said rotated and scaled first image frame and said second image frame; and
 a display device comprising a multiplicity of pixels for displaying said final image frame.

14. The imaging system as recited in claim 13, wherein said computer is further programmed to perform the following steps:
 (a) rotating and scaling said first frequency domain representation in accordance with shear transformations that are a function of said rotation parameter and a scaling transformation that is a function of said rotation parameter and said scaling parameter;
 (b) processing said rotated and scaled first frequency domain representation and said second frequency domain representation to determine first and second translation parameters; and
 (c) translating said first image frame in first and, second directions in accordance with said first and second translation parameters respectively,
 wherein said final image frame of pixel data is a function of said rotated, scaled and translated first image frame and said second image frame.

15. The imaging system as recited in claim 13, wherein said processing step to determine rotation and scaling parameters comprises the following steps:
 (a) transforming the magnitudes of said first and second frequency domain representations into polar coordinates in the frequency domain to form first and second polar-logarithmic representations respectively;
 (b) transforming said first and second polar-logarithmic representations into first and second Fourier-transformed polar-logarithmic representations respectively using a two-dimensional Fast Fourier transformation;
 (c) extracting the phase from each of said first and second Fourier-transformed polar-logarithmic representations;
 (d) transforming a phase difference between said phases of said first and second Fourier-transformed polar-logarithmic representations using a two-dimensional inverse Fast Fourier transformation;
 (e) detecting a maximum in said phase difference;
 (f) determining said rotation parameter as a function of a first coordinate of said maximum; and
 (g) determining said scaling parameter as a function of a second coordinate of said maximum.

16. The imaging system as recited in claim 14, wherein said processing step to determine translation parameters comprises the following steps:
 (a) extracting the phase from each of said rotated and scaled first frequency domain representation and said second frequency domain representation;
 (b) transforming a phase difference between said phase of said rotated and scaled first frequency domain representation and said phase of said second frequency domain representation using a two-dimensional inverse Fast Fourier transformation; and
 (c) detecting a maximum in said phase difference, said first and second translation parameters being first and second coordinates of said maximum respectively.

17. The imaging system as recited in claim 16, wherein said computer is further programmed to perform the step of comparing said maximum phase difference to a predetermined threshold.

18. The imaging system as recited in claim 14, wherein said final image frame of pixel data is produced by spatially compounding a set of image frames including at least said first image frame after said rotating, scaling and translating steps and said second image frame.

19. The imaging system as recited in claim 15, wherein said final image frame of pixel data is produced by reconstructing a three-dimensional image from a set of image frames including at least said first image frame after said rotating, scaling and translating steps and said second image frame.

20. The imaging system as recited in claim 14, wherein said transforming step comprises the steps of combining said first and second image frames in an even location-odd location separation and then transforming said combined image frames in a single two-dimensional Fast Fourier transformation.

21. The imaging system as recited in claim 14, further comprising:
 an ultrasound transducer array comprising a multiplicity of transducer elements;
 a transmit beamformer for pulsing selected transducer elements during first and second series of transmit firings constituting first and second scans respectively;
 a receive beamformer coupled to selected transducer elements of said transducer array for acquiring a respective receive signal subsequent to each transmit firing;
 a signal processor programmed to form first and second sets of processed signals from said receive signals for said first and second scans respectively; and
 a converter for converting said first and second sets of processed signals into said first and second image frames respectively.

22. An imaging system comprising:
 a memory for storing first and second image frames of pixel values;
 means for transforming said first and second image frames into first and second frequency domain representations respectively using a two-dimensional Fast Fourier transformation;

means for processing said first and second frequency domain representations to determine a rotation parameter and a scaling parameter needed for said first image frame to be in registration with said second image frame;

means for rotating said first image frame in accordance with said rotation parameter;

means for scaling said first image frame in accordance with said scaling parameter; and means for producing a final image frame of pixel data which is a function of said rotated and scaled first image frame and said second image frame; and a display device comprising a multiplicity of pixels for displaying said final image frame.

23. The imaging system as recited in claim 22, further comprising:

means for rotating and scaling said first frequency domain representation in accordance with shear transformations that are a function of said rotation parameter and a scaling transformation that is a function of said rotation parameter and said scaling parameter;

means for processing said rotated and scaled first frequency domain representation and said second frequency domain representation to determine first and second translation parameters; and means for translating said first image frame in first and second directions in accordance with said first and second translation parameters respectively, wherein said final image frame of pixel data is a function of said rotated, scaled and translated first image frame and said second image frame.

24. The imaging system as recited in claim 22, wherein said processing means for determining rotation and scaling parameters comprise:

means for transforming the magnitudes of said first and second frequency domain representations into polar coordinates in the frequency domain to form first and second polar-logarithmic representations respectively;

means for transforming said first and second polar-logarithmic representations into first and second Fourier-transformed polar-logarithmic representations respectively using a two-dimensional Fast Fourier transformation;

means for extracting the phase from each of said first and second Fourier-transformed polar-logarithmic representations;

means for transforming a phase difference between said phases of said first and second Fourier-transformed polar-logarithmic representations using a two-dimensional inverse Fast Fourier transformation;

means for detecting a maximum in said phase difference;

means for determining said rotation parameter as a function of a first coordinate of said maximum; and means for determining said scaling parameter as a function of a second coordinate of said maximum.

25. The imaging system as recited in claim 23, wherein said processing means for determining translation parameters comprise:

means for extracting the phase from each of said rotated and scaled first frequency domain representation and said second frequency domain representation;

means for transforming a phase difference between said phase of said rotated and scaled first frequency domain representation and said phase of said second frequency domain representation using a two-dimensional inverse Fast Fourier transformation; and means for detecting a maximum in said phase difference, said first and second translation parameters being first and second coordinates of said maximum respectively.

26. The imaging system as recited in claim 23, wherein said means for producing a final image frame comprise means for spatially compounding a set of image frames including at least said first image frame after said rotating, scaling and translating steps and said second image frame.

27. The imaging system as recited in claim 23, wherein said means for producing a final image frame comprise means for reconstructing a three-dimensional image from a set of image frames including at least said first image frame after said rotating, scaling and translating steps and said second image frame.

28. A method for image frame registration, comprising the steps of:

storing first and second image frames of pixel values;

edge detecting said first and second image frames to form first and second edge-detected image frames respectively;

transforming said first and second edge-detected image frames into first and second frequency domain representations respectively using a two-dimensional Fast Fourier transformation;

processing said first and second frequency domain representations to determine a rotation parameter and a scaling parameter needed for said first image frame to be in registration with said second image frame;

rotating said first image frame in accordance with said rotation parameter; and scaling said first image frame in accordance with said scaling parameter.

29. A system for image frame registration comprising:

a memory for storing first and second image frames of pixel values; and an image registration processor programmed to perform the steps of:

(a) edge detecting said first and second image frames to form first and second edge-detected image frames respectively;

(b) transforming said first and second edge-detected image frames into first and second frequency domain representations respectively using a two-dimensional Fast Fourier transformation;

(c) processing said first and second frequency domain representations to determine a rotation parameter and a scaling parameter needed for said first image frame to be in registration with said second image frame;

(d) rotating said first image frame in accordance with said rotation parameter; and (e) scaling said first image frame in accordance with said scaling parameter.

* * * * *